C. H. MORROW.
SAFETY DEVICE FOR MACHINE ELEMENTS.
APPLICATION FILED SEPT. 27, 1919.
1,369,832.
Patented Mar. 1, 1921.
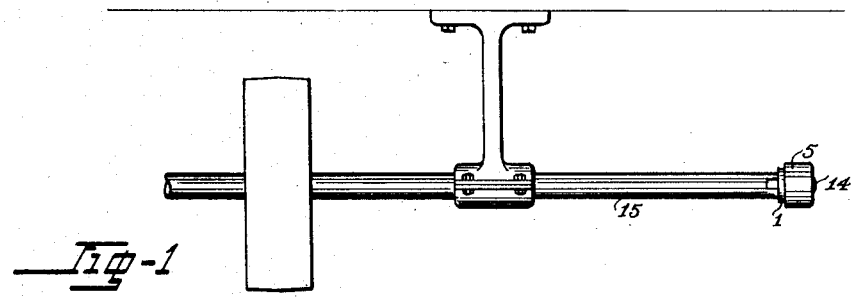
Fig-1
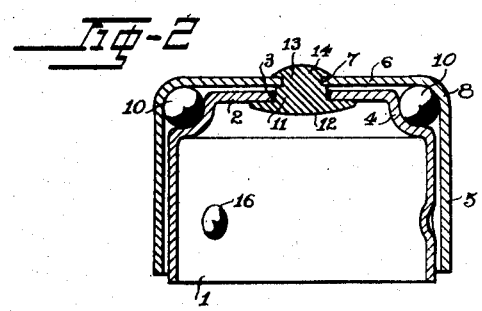
Fig-2
Fig-3
Fig-4
Inventor
C. H. Morrow
By Hull Smith Brock & West
Attys

UNITED STATES PATENT OFFICE.

CLARENCE HERBERT MORROW, OF CLEVELAND, OHIO, ASSIGNOR TO THE NATIONAL FORMETAL COMPANY, OF CLEVELAND, OHIO, A CORPORATION OF OHIO.

SAFETY DEVICE FOR MACHINE ELEMENTS.

1,369,832.   Specification of Letters Patent.   Patented Mar. 1, 1921.

Application filed September 27, 1919. Serial No. 326,767.

*To all whom it may concern:*

Be it known that I, CLARENCE HERBERT MORROW, a citizen of the United States, residing at Cleveland, in the county of Cuyahoga and State of Ohio, have invented a certain new and useful Improvement in Safety Devices for Machine Elements, of which the following is a full, clear, and exact description, reference being had to the accompanying drawings.

This invention relates to safety devices for machinery and has special reference to a protector for the exposed end of shafting or other rotatable machine elements which shall prevent casualties due to contact therewith. It has long been known that the ends of rotating shafts are particularly dangerous pieces of machinery, especially if the same be provided, as is usually the case, with key ways for the attachment of pulleys or the connection of other shafts thereto. Such shaft ends will oftentimes seize upon a workman's clothing and cause death or serious injury, and this even though the shaft be located high above the floor, since it is frequently necessary for a man to ascend a ladder in its vicinity. For this reason the factory inspection and equipment laws and ordinances of most States and municipalities require the provision of a guard of some nature for the ends of such rotary elements, and this in the case of shafting usually takes the form of a framework of scantling or other wooden members which is at once expensive in construction and unsightly in appearance.

The objects of the present invention are the provision of a shielding device, for such rotatable elements, which shall be light, simple, attractive, serviceable, cheap and easily applied and removed, and which shall not impede the attachment of other pieces of machinery thereto; the provision of a simple and self-contained device which can be produced as an article of manufacture and employed in all installations; while other objects and advantages of my invention will become apparent as the description proceeds.

In the drawing accompanying and forming a part of this application, I have shown one embodiment of my said invention together with one instance of its application to rotary mechanical element although it will be understood that I restrict myself neither to this one construction, nor to this one instance of use. In these drawings, Figure 1 illustrates a line shaft provided with a safety device of my invention; Fig. 2 is a longitudinal section through a preferred construction of safety device; Fig. 3 is a bottom plan view of the device shown in Fig. 2; and Fig. 4 is a perspective view of the separated elements of said device prior to assembling.

My improved safety device comprises essentially an inner part and an outer part rotatably connected together, the inner part being adapted for attachment to the rotating element and the outer part constituting a shield therefor. In the present embodiment, the inner part consists of a metal cup having a substantially cylindrical side-wall 1 and a flat circular bottom-wall 2 formed with a central aperture 3 and joined to the side wall by an annular inclined raceway 4. This part is preferably made from sheet metal by a simple drawing operation, and in the present embodiment I have shown the angle of the raceway 4 as varying from point to point constituting a concave groove.

The outer member in the present embodiment comprises a slightly larger cup having a cylindrical wall 5 and a flat circular bottom 6 having a central hole 7 smaller than and coaxial with the aperture 3, the bottom and sides constituting a complementary ball-race 8. Between the two portions constituting the raceway, I have illustrated anti-friction balls 10, and to hold the two members together, I have illustrated a rivet, having a body portion 11 fitting loosely in the aperture 3, with a head 12 at one end overlying interiorly the bottom 2 and with a reduced shank 13 at its opposite end passing snugly through the hole 7 and upset as shown at 14 to engage permanently the bottom 6. It will thus be seen that the rivet turns with the outer cup.

In use, this device is merely pressed upon the end of the machine element, which it is desired to protect, such as the shaft 15 shown in Fig. 1. The device is made up complete as an article of manufacture to be kept in stock and sold as a unit. The number of customary sizes of shaft is not large and the variation between different shafts of the same approximate size is very small, wherefore there is very little difficulty in applying the device. In order to compensate for slight differences between shafts, I sometimes taper slightly the walls of cup 1 or form such walls with corrugations such as the bosses 16. Such a device can be made and sold at a profit at a price much less than that required to construct a framework and will be found equally efficacious in preventing accidents, inasmuch as contact with the external cup will merely arrest the rotation of the latter without the development of any such degree of force as to incur danger. The device can be removed instantly if desired to connect any other shaft or element thereto.

I do not restrict myself to the employment of inner and outer members of the exact shape here shown, or to the interposition of ball-bearings or other anti-frictional means therebetween, or in any other way except as recited in my claims since I am aware that many changes in detail can be made within the scope of my invention.

Having thus described my invention what I claim is:

1. A safety device for rotating machine-elements comprising, in combination, an inner member adapted to be attached to such element, and an outer shielding member rotatably connected to said inner member at a point coincident with the longitudinal axis of said machine element.

2. A safety device for rotating machine-elements comprising, in combination, an inner member adapted to be attached to such element, an outer shielding member embracing said inner member, and means including an anti-friction bearing whereby said members are secured rotatably together.

3. A safety device for rotating machine-elements comprising, in combination, a metal cup adapted for application to such element, a second cup overlapping the same and coaxial therewith, and means pivoting said cups together upon their common axis, said pivot point coinciding with the longitudinal axis of said machine element.

4. As an article of manufacture, a pair of sheet metal cups located one within the other and having substantially cylindrical walls spaced slightly from each other and turned in the same direction, means engaging the bottoms of said cups and holding the same against separation, and anti-friction means between the bottoms of said cups, preventing undue approach toward each other.

5. In a device of this character described, an inner and an outer metal cup, the inner cup having a substantially cylindrical wall, and a flat, circular bottom having a central aperture and connected to said wall by an annular sloping portion constituting a ball race, the outer cup having a substantially cylindrical wall overlying and spaced from the first wall, and a flat circular bottom having a central hole smaller than said aperture, anti-friction balls in said race, and a headed rivet loosely traversing said aperture and rigidly seated in said hole.

6. As an article of manufacture and sale a safety shield for rotating machine elements comprising a member adapted to be detachably connected to the machine element and to rotate therewith, and a second member permanently but rotatably connected to the first member at a point coincident with the axis of the machine element.

In testimony whereof, I hereunto affix my signature.

CLARENCE HERBERT MORROW.